(12) United States Patent
Northey et al.

(10) Patent No.: US 9,368,840 B2
(45) Date of Patent: Jun. 14, 2016

(54) METHOD FOR MAINTAINING THE PERFORMANCE LEVEL OF AN ELECTROCHEMICAL CELL

(71) Applicant: General Electric Company, Schenectady, NY (US)

(72) Inventors: Rebecca Suzanne Northey, Delmar, NY (US); Peter John Bonitatibus, Jr., Saratoga Springs, NY (US); John Thomas Leman, Schenectady, NY (US); Job Thomas Rijssenbeek, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 743 days.

(21) Appl. No.: 13/690,644

(22) Filed: Nov. 30, 2012

(65) Prior Publication Data

US 2014/0152265 A1    Jun. 5, 2014

(51) Int. Cl.
*H02J 7/00* (2006.01)
*H01M 10/44* (2006.01)
*H01M 10/0562* (2010.01)
*H01M 10/39* (2006.01)

(52) U.S. Cl.
CPC .......... *H01M 10/44* (2013.01); *H01M 10/0562* (2013.01); *H01M 10/39* (2013.01); *H02J 7/0057* (2013.01)

(58) Field of Classification Search
None
See application file for complete search history.

(56) References Cited

U.S. PATENT DOCUMENTS

| 7,193,394 | B2 * | 3/2007 | Ueda et al. | 320/128 |
| 7,612,536 | B2 * | 11/2009 | Hoffer et al. | 320/133 |
| 2010/0068610 | A1 * | 3/2010 | Sudworth | 429/102 |

* cited by examiner

*Primary Examiner* — Patrick Ryan
*Assistant Examiner* — Christopher Domone
(74) *Attorney, Agent, or Firm* — Francis T. Coppa

(57) ABSTRACT

A method of maintaining the performance level of an electrochemical cell is described. The cell usually includes a negative electrode that includes an alkali metal; a positive electrode that includes at least one transition metal halide; a molten salt electrolyte based on an alkali metal haloaluminate; and a sodium ion-conducting solid electrolyte partitioning the positive electrode from the negative electrode. The method is based on a treatment regimen that includes the step of applying a series of electrical cycles to the cell, wherein the series includes at least one deep discharge of the cell. Each discharge of the cell is usually followed by recharging the cell to its available capacity.

13 Claims, 2 Drawing Sheets

METHOD FOR MAINTAINING THE PERFORMANCE LEVEL OF AN ELECTROCHEMICAL CELL

TECHNICAL FIELD

This invention relates generally to an electrochemical cell, and in some specific embodiments, to methods for maintaining the performance level of the cell, and the performance level of a battery based on a number of such cells.

BACKGROUND OF THE INVENTION

A battery is a device that includes one or more electrochemical cells, and converts stored chemical energy into electrical energy. In some important applications, one or more batteries are used to store a portion of the energy in mobile systems such as electric vehicles and hybrid electric vehicles. Examples include locomotives, off-highway mining vehicles, marine applications, buses, and automobiles. The batteries can also be used in important stationary applications, such as uninterruptible power supply (UPS) systems and diesel-battery hybrid systems for off-grid or weak-grid telecommunication stations. High-temperature sodium-metal halide electrochemical cells are often targeted for many of these applications.

A sodium-metal halide battery is typically made up of many sodium-metal halide cells. The cell usually includes a negative electrode comprising sodium; a positive electrode comprising nickel chloride; a molten salt electrolyte comprising sodium tetrachloroaluminate; and a solid electrolyte partitioning the positive electrode from the negative electrode. One surface of the solid electrolyte is in contact with the positive electrode, and another surface is in contact with the negative electrode. Multiple sodium metal halide cells can be connected in series or parallel to form a stack.

Critical end use applications like UPS require the batteries to be in standby mode for most of their life, but also require them to provide high power (e.g., 120 W-250 W per cell) when called for, for time periods ranging from about 30 seconds to 15 minutes. These requirements position sodium metal-halide batteries as good candidates for demanding applications, in terms of high power density and relatively low cost. The batteries are often expected to operate in this manner over a life span of up to about 20 years.

In standby mode, batteries used in applications like UPS often need to be connected directly to the critical electrical load, so that they can support the load immediately in case of a "mains" power failure. This requires the batteries to be kept at a charging voltage. This state is referred to as float charging, or simply, "float". Techniques for float charging are usually successful at off-setting self-discharge reactions, and maintaining the batteries in a fully-charged state.

However, sodium metal-halide batteries usually do not experience self-discharge, and can sometimes exhibit an increase in electrical resistance during float charging. This increase is undesirable, because it can lead to lower power delivery and/or support time from the battery, i.e., below specified requirements for critical applications, including those that may be situated in remote locations. The resistance rise often appears to be directly related to the applied float-charge voltage. Moreover, the resistance can often constitute two different phenomena. One is an early resistance-rise that usually occurs over the initial 0-2 ampere-hours discharged, referred to as a "low amp-hour" resistance rise. The second event is a more constant, uniform ("series") resistance-rise that is generally present through most or all of the discharge. Either of these resistance-events can adversely affect the performance of the battery.

In view of some of these concerns and challenges, new methods for maintaining the performance level of a sodium-metal halide electrochemical cell or other type of energy storage device would be welcome in the art. The new techniques should lower the resistance during various times in a cell's time-on-float, thereby restoring the cell—at least on a partial basis—to its original power capability, and improving its projected lifespan. Moreover the techniques should be relatively straightforward and economical to implement.

BRIEF DESCRIPTION

A method of maintaining the performance level of an electrochemical cell is described. The cell usually includes a negative electrode that comprises an alkali metal; a positive electrode that comprises at least one transition metal halide; a molten salt electrolyte comprising an alkali metal haloaluminate; and a sodium ion-conducting solid electrolyte partitioning the positive electrode from the negative electrode. The method includes a treatment regimen comprising the step of applying a series of electrical cycles to the cell, wherein the series comprises at least one deep discharge of the cell.

DETAILED DESCRIPTION

Approximating language, as used herein throughout the specification and claims, may be applied to modify any quantitative representation that could permissibly vary, without resulting in a change in the basic function to which it is related. Accordingly, a value modified by a term or terms, such as "about", is not limited to the precise value specified. In some instances, the approximating language may correspond to the precision of an instrument for measuring the value. The terms "first," "second," and the like, herein do not denote any order, quantity, or importance, but rather are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable. For example, in some circumstances, an event or capacity can be expected, while in other circumstances, the event or capacity cannot occur. This distinction is captured by the terms "may" and "may be".

Figure 1:
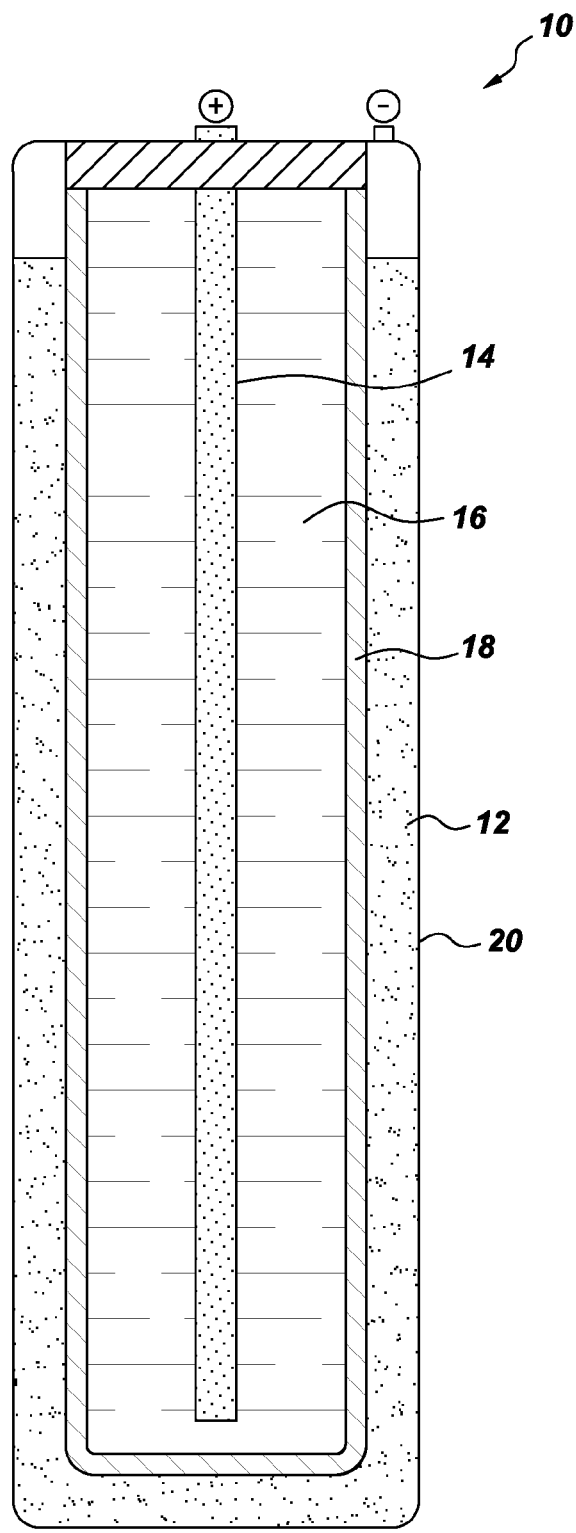
FIG. 1 is a schematic, cross-sectional view of an exemplary electrochemical cell described in regard to some embodiments of this invention.

FIG. 1 illustrates a schematic of an electrochemical cell 10, according to one aspect of the invention. The electrochemical cell 10 includes an anode chamber 12; a cathode chamber 16 that includes a mixture of cathodic material and electrolyte;

and a separator 18. The anode chamber 12 may include a sodium ion source such as, for example, molten sodium. The cathodic material may include transition metals such as nickel, cobalt, and/or iron metals, along with their metal halides. The cathode material may further include an alkali metal halide such as, for example, sodium chloride.

The cell 10 further includes a cathode current collector 14, and an anode current collector 20. An excess of solid-state nickel in the cathode chamber 16 may exhibit continuous connectivity and thereby serve as an extended electronic current collector or "electronic grid." The electrolyte may include an ionically conductive sodium metal halide, such as, for example, molten sodium tetrachloroaluminate ($NaAlCl_4$). The anode chamber 12 and cathode chamber 16 are separated by a separator 18. The separator 18 is usually a sodium ion-conducting solid electrolyte. Suitable materials for the separator 18 may include beta'-alumina, beta"-alumina, beta'-gallate, beta"-gallate, or zeolite. In some preferred embodiments, the separator 18 includes a beta"-alumina (beta double-prime alumina) solid electrolyte (BASE).

Sodium metal halide cells conforming to the structure of cell 10 are often manufactured in a discharged state. The cathode compartment is filled with at least one transition metal M (such as, for example, nickel, cobalt, iron, or any combinations of these elements), sodium chloride (NaCl), other optional additives, and a liquid (molten) electrolyte mentioned previously. Moreover, it should be noted that other types of sodium metal halide cells can also be rejuvenated according to embodiments of this invention. These cells may differ in composition and/or structure (e.g., with the electrodes generally reversed in position, as compared to FIG. 1), but still conform to the "sodium metal halide" class of devices.

When the sodium battery is first charged by applying a voltage between the anode and the cathode of the cell, sodium ions provided by the dissolution of sodium chloride from the cathode travel through the liquid electrolyte and the separator. These ions then combine with electrons from the external circuit, to form the sodium electrode. The separator is electronically insulating, while at the same time, it is a conductor of sodium ions. When the cell is charged or partially charged at its operating temperature, the anode contains liquid sodium.

The chloride ions from the dissolution of sodium chloride react with the transition metal in the cathode to form metal chloride, and donate electrons back to the external circuit. The process is reversed during discharge, with sodium ions traveling through the separator to re-form NaCl in the cathode, as shown below.

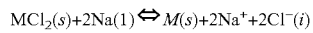

$MCl_2(s)+2Na(1) \Leftrightarrow M(s)+2Na^++2Cl^-(i)$

The charging of a sodium metal halide cell is traditionally carried out using a constant current charging method, a constant voltage charging method, or using a combination of constant current and constant voltage charging methods.

In the case of sodium metal halide batteries, the solid electrolyte is most often formed of the BASE material described above, in highly preferred embodiments. This material is a fast ion conductor that is capable of rapidly transporting sodium ions through its structure, while blocking other species, such as liquid sodium. Efficient ion transport is often very important for these types of batteries.

As described previously, sodium metal-halide batteries can sometimes exhibit high electrical resistance states, during float life, in either a low amp-hour region or a higher amp-hour region, or in both regions. The resistance rise can adversely affect the entire cell.

As mentioned previously, the treatment regimen described herein can rejuvenate a battery or other type of electrochemical cell. As shown in the examples, the treatment regimen can improve the resistance-capacity profile of the cell during its float life. In some instances, the cell can be returned to nearly its original performance level.

The treatment regimen comprises a pre-selected sequence of electrical cycles applied to the cell, and includes at least one deep discharge of the cell. (The treatment regimen usually takes place after the cell has been maintained under a float condition for a period of time, and then taken off of float for the treatment). As used herein, a "deep discharge" refers to a discharge of at least about 70% of the available capacity of the cell. The "available capacity" of the cell is defined as the capacity discharged at a C/10 rate, to 1.8 volts (V) per cell.

As those skilled in the art understand, knowledge of the discharge time and given capacity for a cell allows one to determine the discharge rate. The C/10 discharge rate can be defined as the rate which would discharge the nominal, rated capacity of the cell in 10 hours. This rate is independent of the number of cells in a battery, for example.

In the case of a sodium metal halide cell, the available capacity is usually in the range of about 30-50 amp-hours. In some specific embodiments, the deep discharge is a discharge of at least about 80% of the available capacity of the cell, and in some cases, at least about 90% of the available capacity. (Moreover, in some preferred embodiments, the treatment sequence is initiated with a deep discharge).

In some cases, the deep discharge is carried out for an extended time period of at least about 6 hours, until the cell reaches a minimum voltage that cannot support a pre-selected electrical load or power level. Depending in part on cell type and design, the discharge period will sometimes be carried out for at least about 8 hours, and in some cases, at least about 10 hours. As those skilled in the art understand, knowledge of the discharge time and given capacity for a cell allows one to determine the discharge rate (here, the C/10 rate defined above).

The deep discharge cycle is usually performed at a fixed current (e.g., about 2 amps to about 60 amps). However, the cycle can also be performed with a variable current, at a fixed power level, or at a variable power level. In some cases, the discharge is carried out for a period of time until the terminal voltage of the cell reaches a fixed voltage. The specific current and time periods will vary, depending on the specific type of cell, e.g., the composition of its electrolyte and electrodes, as well as their configuration. In some instances, a higher current level, within the range noted above, may be beneficial in increasing the discharge rate. However, the higher current level may sometimes affect the cell chemistry, and those effects need to be considered.

The discharge current selected will sometimes correspond to the discharge ratio, i.e., the rate at which the full-rated energy capacity of the cell would be discharged in 1 hour. As those skilled in the art understand, every type of battery is characterized by a specific terminal voltage ("Vn", sometimes referred to as the voltage limit) at the end of a discharge. As an example in the case of a sodium-metal halide battery with a number of actual cells (n), connected serially in the battery pack, the Vn value for a deep discharge may be about 1.7 volts, multiplied by (n) cells.

Following the deep discharge, the cell is usually recharged up to its full capacity. Any conventional technique for recharging the cell can be employed. As an example, a D.C. source or other suitable power outlet can be used to apply constant current until a 2.67 volt level is reached for the cell, followed by applying a constant voltage that results in a minimum current of about 0.5 amp. (This recharging technique is merely illustrative. For example, more rapid recharging could be carried out at higher voltages, as long as it is determined that the cells will not be damaged under those conditions). Moreover, in some instances, it may not be necessary to recharge the cell to its full capacity, i.e., a partial recharge may be sufficient for a desired improvement in the cell's performance level.

After being recharged, at least one additional discharge is undertaken. The additional discharge can be characterized as a "medium discharge", i.e., one that results in less of a discharge of the cell's available capacity, as compared to a deep discharge. In some specific embodiments, the medium discharge is defined as a value in the range of about 15% to about 45% of the cell's available capacity. Following the medium discharge, the cell may be recharged to its full capacity (or may in some cases, be partially recharged), e.g., by one of the techniques discussed previously.

In some specific embodiments, the treatment regimen comprises at least two of the medium discharges. Each is usually within the broader range discussed above, although they may have independent (i.e., different) discharge levels from each other. As in the case of the deep discharge, each medium discharge can be performed at a fixed current (e.g., about 2 amps to about 60 amps), although other current and power patterns are possible.

In other preferred embodiments, more than two medium discharges are undertaken, each having an independent discharge level. The most appropriate number of medium discharges will depend on various factors. They include: the particular type of electrochemical cell; its available capacity; the observed resistance rise (series resistance or low amp-hour resistance, or both) in test-runs while a cell is in the float mode; the construction of the electrochemical cell; e.g., type of cathode, anode, liquid electrolyte, and solid electrolyte; as well as the compositional purity of each of these components.

In some embodiments, the treatment regimen may comprise groups or "blocks" of discharges, e.g., from about 3 to about 100 discharges, each followed by a recharge (usually a full recharge). Each discharge could be carried out at a different power level; or groups of power levels could be employed as well. Moreover, groups of deep discharges (or just one deep discharge) could sometimes be followed by groups of medium discharges, e.g., a group of at least five medium discharges, at a pre-selected power level, or at pre-selected, different power levels.

As a non-limiting example, a single constant-current discharge at 3-4 amps could be followed by 50-80 discharges at 120-150 watts; followed by 5-10 discharges at about 80-100 watts; and then followed by 10-20 discharges at about 100-150 watts. As another example, a single constant-current discharge at 3-4 amps could be followed by about 15-25 discharges at 120-150 watts; followed by 2-10 discharges at about 80-100 watts; and then followed by a single discharge at about 100-150 watts. Those skilled in the art, based in part on the teachings herein, will be able to determine the most appropriate regimen for a given situation. Some of the factors taken into account include observations and factors like resistance-profile measurements, and the amount of time and energy expended in the regimen. In the most frequent embodiments, the cell is returned to a float condition after the treatment regimen is completed.

The efficacy of the treatment regimen can be determined by an evaluation of the discharge performance after a selected number of discharges or discharge sequences. As shown in the examples below, the treatment regimen can result in a rejuvenated cell that performs nearly identically to its original performance. However, even a discharge performance that is improved to a much lesser degree may be valuable in many circumstances, in terms of extending the life of a commercial battery, for example.

The treatment regimen described herein can be performed in generally any location in which a battery might be located. In some embodiments, it is expected that the treatment would be part of a pre-planned service operation for commercial batteries that are maintained in the float state. Moreover, in some cases, it would be possible to have a treatment regimen engage automatically. For example, the regimen could be activated in response to a measured output of an electrochemical cell or a battery pack in which the cell is incorporated. The output could automatically be measured, relative to a selected minimum voltage for the cell (e.g., at a selected discharge rate), over a selected cell discharge period. Other aspects related to the automatic maintenance of rechargeable batteries are described in U.S. Pat. No. 4,302,714 (Yefsky), which is incorporated herein by reference.

EXAMPLES

The examples presented below are intended to be merely illustrative, and should not be construed to be any sort of limitation on the scope of the claimed invention.

Example 1

A single sodium metal halide cell was used in this example. The cell included a negative electrode (sodium); a positive electrode (nickel chloride); a molten salt electrolyte containing sodium tetrachloroaluminate; and a solid electrolyte formed of a BASE material. The operation of the cell was controlled and monitored with the use of a commercial battery cycler.

The cell was incorporated into an electrical "float"/maintenance mode, at an elevated temperature of about 295° C., using a "float voltage" of 2.62 V (and trickle-charged). The cell was then discharged at a temperature of 295° C., and at a power level of 135 watts, until the cell reached a minimum voltage of 1.8 V. Following recharging, the same discharge protocol was carried out every two weeks.

The relationship between resistance and discharged capacity (Ah) for a number of samples was studied, corresponding to biweekly evaluations, with an evaluation period extending from about 56 days to 327 days.

The data showed that, over the course of 327 days, a steady rise in resistance occurred, in the absence of any rejuvenation treatments according to embodiments of this invention. The resistance-rise occurred in both the low amp-hour region, as well as in the general region that spanned the discharge curves across the discharge progression (in Ah values), i.e., the "series resistance". Once a minimum voltage level was reached as a result of the increasing resistance, the degraded cell could not be discharged any further. In this example, the discharge power (135 W) and the minimum voltage setting (1.8 V) combine to establish a maximum resistance limit of 10.4 milli-ohms.

Figure 2:
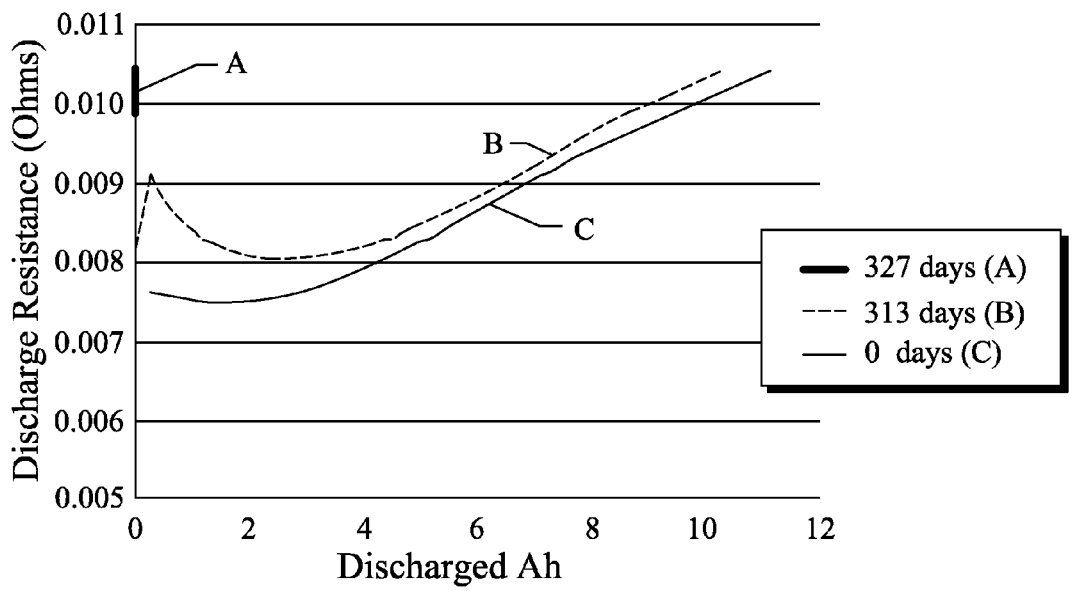
FIG. 2 is a plot representing electrochemical cell resistance as a function of discharged capacity.

FIG. 2 is a simplified plot representing resistance as a function of discharged capacity (Ah), for evaluation of the sodium metal halide cell of Example 1, i.e., where no rejuvenation treatment steps were undertaken. The data curve "A" represents a beginning-of-cell-life situation for the cell, with a discharge time of 9.85 min at a power of 135 watts, to a minimum voltage of 1.8 V. (The cell has entered an electrical "float"/maintenance mode).

After being discharged, the cell was recharged, floated, and again discharged two weeks later, at a power level of 135 watts, until the cell reached a minimum voltage of 1.8 V. As noted above, the periodic discharge protocol was performed every two weeks, to obtain the additional curves "B" and "C". Curve "B" represents the resistance behavior after 313 days in the float stage (the cell discharged for 8.94 min). The truncated curve "C" is an indication that, after about a 1-year period in the float state, the resistance limit has been reached immediately upon application of the load, thus preventing any support time. Due to the resistance level in this low-Ah region (curve C), the cell can no longer discharge at 135 watts, and is no longer of any practical use.

Figure 3:
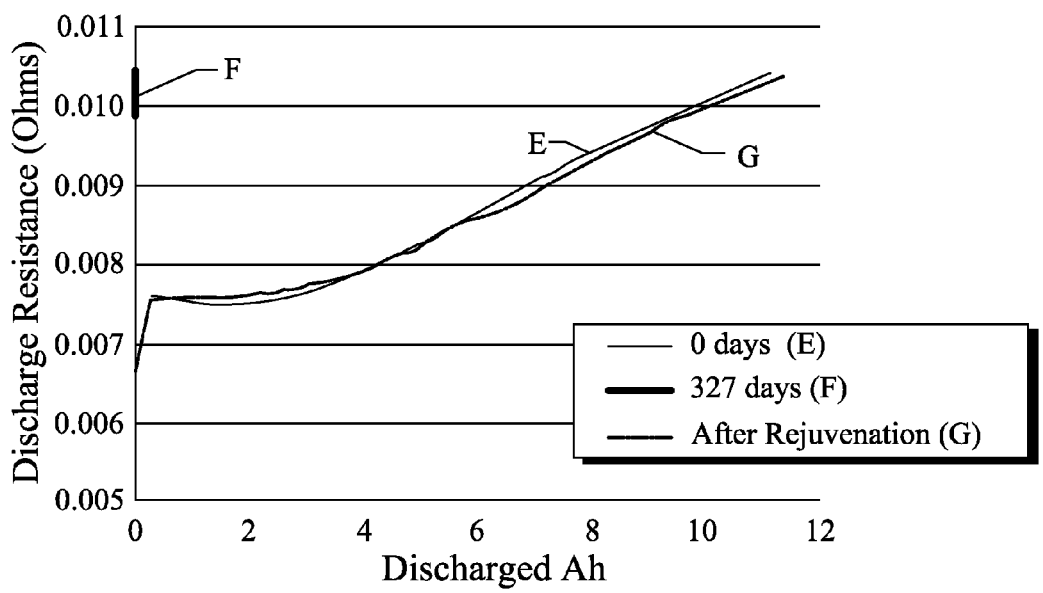
FIG. 3 is another plot representing electrochemical cell resistance as a function of discharged capacity.

FIG. 3 relates to a sodium metal halide cell (identical to the one referenced in the beginning of the example) that was subjected to a treatment regimen according to some embodiments of this invention. In this instance, a series of charge/discharge cycles was undertaken, as follows:

1) One deep discharge for about 11 hours, at 3.8 amps, to result in a measured discharge capacity of about 42.5 Ah, which represented about 94% of the cell's available capacity;
2) Recharge to full capacity;
3) One medium discharge for 0.2 hour, at 135 watts, resulting in a measured discharge capacity of about 13-14 Ah.
4) Recharge to full capacity;
5) Sixty-nine (69) repetitive, medium discharges, for about 0.2 hours each, at 135 watts, recharging after each discharge, and resulting in a measured discharge capacity of about 13-14 Ah;
6) One medium discharge, for about 0.7 hour, at 90 watts, resulting in a measured discharge capacity of about 24-25 Ah;
7) Recharge to full capacity;
8) Six (6) repetitive, medium discharges, at 90 watts, each carried out for about 0.7 hour, with recharging after each discharge, resulting in a measured discharge capacity of about 24-25 Ah; and
9) Fourteen (14) repetitive, medium discharges, at 135 watts, each carried out for about 0.2 hour, with recharging after each discharge, resulting in a measured discharge capacity of about 13-14 Ah.

FIG. 3 plots resistance as a function of discharged capacity (Ah), for the cell treated according to this regimen. In this instance, the treatment regimen resulted in nearly full rejuvenation of the cell. In other words, curve "G", representing the resistance profile after treatment, very closely corresponds to curve "E", which represents the actual resistance profile of the cell at the beginning of its life. As explained above, the use of the rejuvenation cycle can extend the float life of the cell, or of a battery system or other energy storage device containing a multitude of cells. (In the case of a device that contains a multitude of cells, the treatment regimen is usually applied to all of the cells simultaneously).

Example 2

A single sodium metal halide cell (identical to the one used in Example 1) was subjected to a treatment regimen according to some embodiments of this invention. Here again, the cell reached a resistance level in the low-Ah region so that the cell could no longer discharge at 135 watts, and was no longer of any practical use.

To rejuvenate in this instance, a series of charge/discharge cycles was undertaken, as follows:

1) One deep discharge for about 11 hours, at 3.8 amps, to 42.5 Ah (which represented about 94% of cell's available capacity;
2) Recharge to full capacity;
3) One medium discharge for about 0.2 hours, at 135 watts;
4) Recharge to full capacity;
5) Nineteen (19) repetitive medium discharges, at 135 watts, recharging after each discharge;
6) One medium discharge for about 0.7 hours, at 90 watts;
7) Recharge to full capacity;
8) Two (2) repetitive medium discharges, at 90 watts, recharging after each discharge; and
9) One medium discharge, at 135 watts, recharging after discharge to achieve improved (earlier float) cell performance.

As in Example 1, the treatment regimen here resulted in rejuvenation of the cell. In this instance, there was complete rejuvenation (i.e., approximately a 100% improvement) at the low amp-hour region, for a resistance plot like that of FIG. 3. In terms of the series resistance, a reduction of approximately 50% in resistance was observed.

The present invention has been described in terms of some specific embodiments. They are intended for illustration only, and should not be construed as being limiting in any way. Thus, it should be understood that modifications can be made thereto, which are within the scope of the invention and the appended claims. Furthermore, all of the patents, patent applications, articles, and texts which are mentioned above are incorporated herein by reference.

What is claimed:

1. A method of maintaining a performance level of an electrochemical cell having a negative electrode that comprises an alkali metal; a positive electrode that comprises at least one transition metal halide; a molten salt electrolyte comprising an alkali metal haloaluminate; and a sodium ion-conducting solid electrolyte that partitions the positive electrode from the negative electrode, wherein said method includes a treatment regimen comprising the step of applying a series of electrical cycles to the cell, including at least one deep discharge of at least about 80% of the cell's available capacity, followed by recharging the cell; and then followed by at least two medium discharges, wherein each medium discharge is independently in the range of about 15% to about 45% of the cell's available capacity; and wherein each medium discharge is followed by recharging the cell;

wherein the treatment regimen is carried out after the cell has been maintained for a period of time under a float condition associated with a charging voltage; and wherein the cell is returned to a float condition after the treatment regimen is completed; and wherein the "available capacity" of the cell is defined as the capacity discharged at a rate which would discharge the nominal, rated capacity of the cell to 1.8 volts (V) per cell, in 10 hours.

2. The method of claim 1, wherein the deep discharge is carried out for a period of at least about 6 hours, until the cell reaches a minimum voltage that cannot support a pre-selected electrical load or power level.

3. The method of claim 1, wherein the treatment regimen comprises a group of at least five medium discharges, at a pre-selected power level, following the deep discharge of the cell.

4. The method of claim 3, wherein the treatment regimen further comprises at least one additional group of at least five medium discharges after the first group of medium discharges, wherein the additional group of medium discharges is carried out at a pre-selected power level different from that of the first group of medium discharges.

5. The method of claim 1, wherein the treatment regimen is carried out automatically, in response to a measured output voltage of the cell, relative to a selected minimum voltage for the cell, at a selected rate over a selected cell discharge period.

6. The method of claim 1, wherein the alkali metal haloaluminate comprises sodium tetrachloroaluminate; and the transition metal halide comprises a transition metal chloride.

7. The method of claim 6, wherein the transition metal chloride is nickel chloride, iron chloride, or a combination of nickel chloride and iron chloride.

8. The method of claim 1, wherein the solid electrolyte comprises beta"-alumina (beta double prime alumina).

9. The method of claim 1, wherein the electrochemical cell is situated within an energy storage device that comprises a multitude of such cells, electrically connected to each other.

10. The method of claim 9, wherein the treatment regimen is applied to all of the cells simultaneously.

11. The method of claim 9, wherein the energy storage device is a sodium metal-halide battery.

12. A method of maintaining a performance level of a sodium-metal halide battery, comprising the step of applying a series of electrical cycles to the cell, including at least one deep discharge of at least about 80% of the cell's available capacity, followed by recharging the cell; and then followed by at least two medium discharges, wherein each medium discharge is independently in the range of about 15% to about 45% of the cell's available capacity; and wherein each medium discharge is followed by recharging the cell;

wherein the deep discharge is carried out after the cell has been maintained for a period of time under a float condition associated with a charging voltage; and wherein the cell is returned to a float condition after the step of applying a series of electrical cycles is completed; and wherein the "available capacity" of the cell is defined as the capacity discharged at a rate which would discharge the nominal, rated capacity of the cell to 1.8 volts (V) per cell, in 10 hours.

13. The method of claim 12, wherein the recharging of the cell may be a full recharge or a partial recharge.

\* \* \* \* \*